(12) United States Patent
Aoki

(10) Patent No.: US 8,107,124 B2
(45) Date of Patent: Jan. 31, 2012

(54) IMAGE FORMING APPARATUS

(75) Inventor: Kazuma Aoki, Kasugai (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 805 days.

(21) Appl. No.: 12/211,932

(22) Filed: Sep. 17, 2008

(65) Prior Publication Data

US 2009/0080006 A1 Mar. 26, 2009

(30) Foreign Application Priority Data

Sep. 25, 2007 (JP) ................. 2007-247209

(51) Int. Cl.
*H04N 1/60* (2006.01)
*G01D 15/06* (2006.01)
*G03G 15/00* (2006.01)

(52) U.S. Cl. ............... 358/1.9; 347/116; 399/9; 399/26; 399/36; 399/163; 399/167

(58) Field of Classification Search .......................... None
See application file for complete search history.

(56) References Cited

U.S. PATENT DOCUMENTS

| | | | |
|---|---|---|---|
| 5,444,525 A | | 8/1995 | Takahashi et al. |
| 6,330,404 B1 | | 12/2001 | Munenaka et al. |
| 6,493,533 B1 | | 12/2002 | Munakata |
| 6,546,220 B1 * | | 4/2003 | Asakura et al. ............... 399/227 |
| 7,215,907 B2 | | 5/2007 | Fukuchi et al. |
| 7,561,830 B2 | | 7/2009 | Watahiki |
| 7,564,473 B2 | | 7/2009 | Nomura |
| 7,865,119 B2 * | | 1/2011 | Matsuyama et al. .......... 399/301 |
| 2006/0093410 A1 * | | 5/2006 | Hata ............................. 399/302 |
| 2006/0284967 A1 | | 12/2006 | Nomura |
| 2007/0258729 A1 | | 11/2007 | Ehara et al. |
| 2009/0074429 A1 | | 3/2009 | Abe |
| 2009/0080908 A1 | | 3/2009 | Okuda et al. |
| 2009/0190945 A1 | | 7/2009 | Nomura |

FOREIGN PATENT DOCUMENTS

| | | |
|---|---|---|
| JP | 05-150574 | 6/1993 |
| JP | 06-110272 A | 4/1994 |
| JP | 07-199576 | 8/1995 |
| JP | 07-225544 | 8/1995 |
| JP | 09-081006 | 3/1997 |
| JP | 2000-199988 | 7/2000 |
| JP | 2000-284561 | 10/2000 |

(Continued)

OTHER PUBLICATIONS

JP Office Action dtd Sep. 15, 2009, JP Appln. 2007-247209, English Translation.

(Continued)

*Primary Examiner* — Charlotte M Baker
(74) *Attorney, Agent, or Firm* — Banner & Witcoff, Ltd.

(57) ABSTRACT

In an image forming apparatus, an image forming portion forms an image on a rotator. A first designating portion determines a first estimated phase point based on a base time point, and designate, as a designated parameter, a correction parameter corresponding to said first estimated phase point based on change characteristics information stored in a storage portion. A correcting portion corrects an image forming position on the rotator based on the designated parameter. A changing portion changes a value of the designated parameter into an adjusted value intermediate between the designated parameter and a reference parameter that is a correction parameter designated based on the time when the detecting portion detects the detecting phase point.

12 Claims, 10 Drawing Sheets

FOREIGN PATENT DOCUMENTS

| | | |
|---|---|---|
| JP | 2000-356875 | 12/2000 |
| JP | 2001-005364 | 1/2001 |
| JP | 2001-083760 A | 3/2001 |
| JP | 2003-263089 A | 9/2003 |
| JP | 2006-350046 A | 12/2006 |
| JP | 2007-057954 A | 3/2007 |

OTHER PUBLICATIONS

Japanese Office Action dated Sep. 15, 2009 in Application No. JP2007-242531 and partial English translation thereof.
Japanese Office Action dated Sep. 15, 2009 in Application No. JP2007-247198 and English translation thereof.
US Office Action dated Dec. 22, 2010 in U.S. Appl. No. 12/211,898.

* cited by examiner

FIG.7

| PHASE POINT NUMBER (H) | CORRECTION AMOUNT R(H) |
|---|---|
| 0 | R(0) |
| 1 | R(1) |
| 2 | R(2) |
| 3 | R(3) |
| 4 | R(4) |
| ... | ... |
| HM-1 | R(HM-1) |

IMAGE FORMING APPARATUS

CROSS REFERENCE TO RELATED APPLICATION

The present application claims priority from Japanese Patent Application No. 2007-247209 filed Sep. 25, 2007. The entire content of this priority application is incorporated herein by reference.

TECHNICAL FIELD

The present disclosure relates to an image forming apparatus.

BACKGROUND

An image forming apparatus includes a rotator (such as a photoconductor or a paper conveyer roller), provided to form an image on the rotator or on a recording medium moving with rotation of the rotator. In an electrophotographic printer, for example, an electrostatic latent image is formed on a rotating photoconductor by optical scanning, and thereafter is developed and transferred to a recording medium.

If the photoconductor rotates at a constant speed, line scanning at a constant time interval enables a proper image (as an electrostatic latent image, or a developed or transferred image), in which the scanning line interval is uniform.

However, the photoconductor actually has cyclic variation in rotational speed. This could result in an odd image, in which the scanning line interval has variation. Thus, image quality may be degraded due to the rotational variation of the photoconductor.

In view of this, it has been proposed that an image forming apparatus includes a function for suppressing variation in scanning line interval caused by variation in rotational speed of the photoconductor.

In the image forming apparatus, correction amounts corresponding to some phase points of rotation of the photoconductor are preliminarily measured, and the measurements are stored in a memory. The correction amounts are amounts of time used for correcting the scanning line interval at the respective phase points into a predetermined reference interval.

Specifically, the image forming apparatus starts line scanning (of the rotating photoconductor) in response to an instruction for image formation. During the line scanning, the image forming apparatus regularly estimates the current phase of rotation of the photoconductor, based on detection of the origin phase of the photoconductor by an origin sensor, and further based on an internal clock provided therein.

The above correction amounts are sequentially retrieved according to the estimated current phase. Thereby, the starting time for each scanning line is corrected based on the retrieved correction amounts, so that the scanning line interval is consistently adjusted to the reference line interval.

However, the current phase, estimated based on the detected origin phase and the internal clock as described above, is not necessarily consistent with the actual current phase of the photoconductor. Further, the difference between the estimated current phase and the actual current phase may increase over the cycles of rotation of the photoconductor.

Consequently, the correction amount corresponding to a phase point substantially different from the actual current phase may be retrieved and used for correction, resulting in false correction. Thus, there is a problem that the effect of variation in rotational speed of the rotator cannot be adequately suppressed. This problem is also relevant in other kinds of printers, such as an ink-jet printer.

Thus, there is a need in the art to provide an image forming apparatus capable of suppressing the effect of variation in rotational speed of a rotator on image quality.

SUMMARY

An image forming apparatus according to an aspect of the invention includes an image forming portion, a storage portion, a first designating portion, a correcting portion, a detecting portion and a changing portion.

The image forming portion has a rotator, and is configured to form an image on the rotator or a recording medium traveling with rotation of the rotator. The storage portion is configured to store change characteristics information relevant to correction parameters corresponding to phase points of the rotator.

The first designating portion is configured to determine a first estimated phase point as an estimation of the current phase of the rotator based on a base time point. The first designating portion is further configured to designate, as a designated parameter, the correction parameter corresponding to the first estimated phase point based on the change characteristics information.

The correcting portion is configured to correct an image forming position on the rotator or the recording medium based on the designated parameter. The detecting portion is configured to detect that the rotator has reached a detecting phase point.

The changing portion is configured to change the value of the designated parameter into an adjusted value intermediate between the designated parameter and a reference parameter that is a correction parameter designated from the correction parameters based on the time when the detecting portion detects the detecting phase point.

According to the present invention, the first estimated phase point is determined based on the base time point, and the correction parameter corresponding to the first estimated phase point is designated as the designated parameter based on the change characteristics information. The image forming position on the rotator or the recording medium is corrected based on the designated parameter.

If the designated parameter is shifted to the correction parameter corresponding to the detecting phase point (i.e., the first estimated phase point is shifted to the detecting phase point so as to become more approximate to the actual phase of the rotator) at the time of detection of the detection phase point, the shift amount of the designated parameter (i.e., the difference between the pre-shift designated parameter and the post-shift designated parameter) could be large. That is, the designated parameter used for correcting the image forming position will change abruptly around the detecting phase point, which could adversely affect the image quality.

In view of this, according to the present invention, the value of the designated parameter is changed into an adjusted value intermediate between the designated parameter and the reference parameter, so that the image forming position is corrected based on the adjusted value. Thereby, correction of the image forming position can be achieved while suppressing abrupt change of the designated parameter.

The reference parameter is a correction parameter designated from the correction parameters based on the time when the detecting phase point is detected. Therefore, the phase point corresponding to the reference parameter may be more approximate to the actual phase of the rotator than that corresponding to the designated parameter.

Consequently, according to the present invention, the effect of variation in rotational speed of the rotator on image quality can be adequately suppressed.

BRIEF DESCRIPTION OF THE DRAWINGS

Illustrative aspects in accordance with the present invention will be described in detail with reference to the following drawings wherein:

FIG. 7 is a table showing a data structure in an NVRAM;

DETAILED DESCRIPTION

<Illustrative Aspect>

An illustrative aspect of the present invention will be explained with reference to FIGS. 1 to 10.

(General Construction of Printer)

Figure 1:
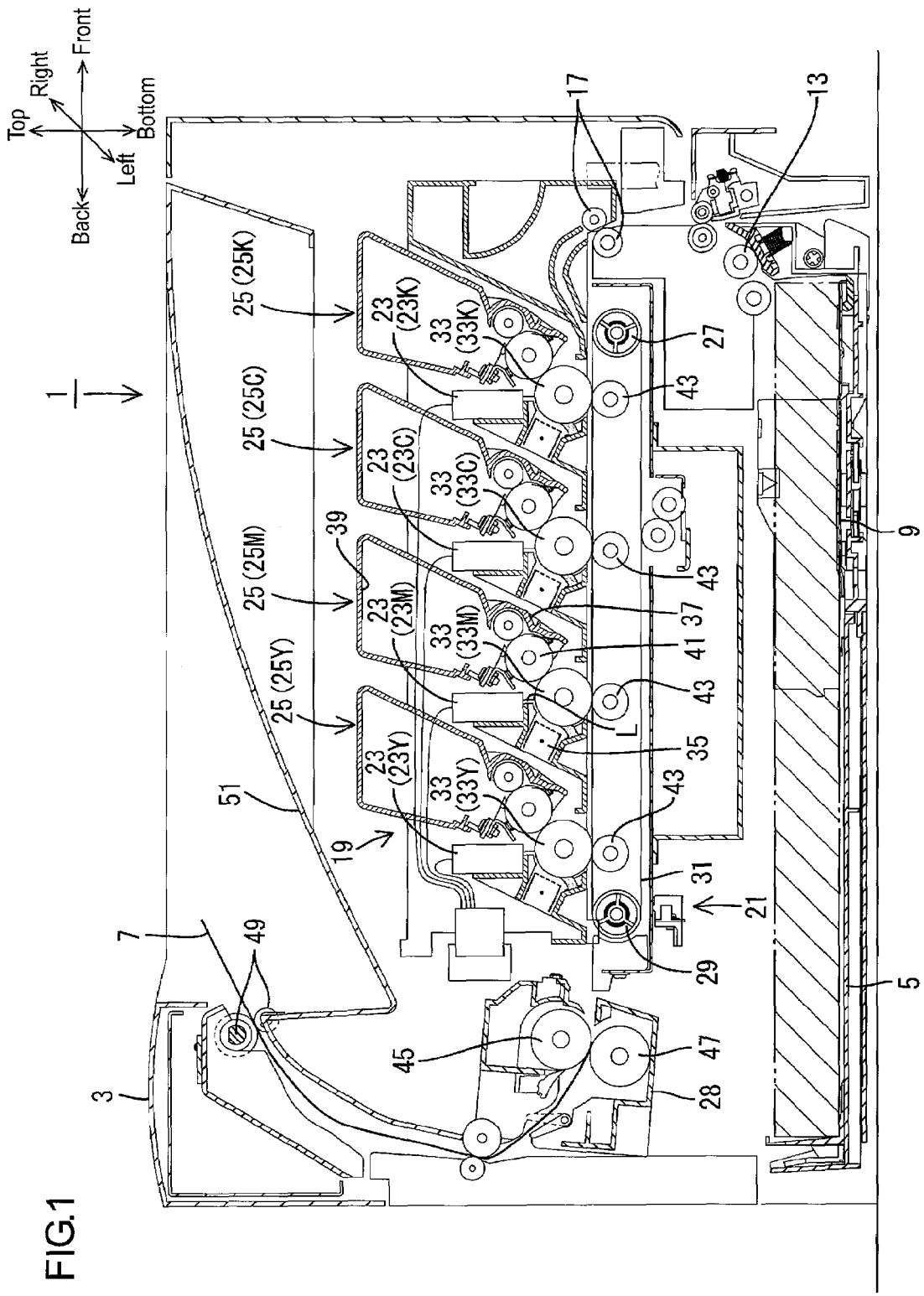
FIG. 1 is a schematic sectional side view of a printer according to an illustrative aspect of the present invention.

FIG. 1 is a schematic sectional side view of an electrophotographic printer 1 according to the present aspect. Hereinafter, the right side of FIG. 1 is referred to as the front side of the printer 1.

Specifically, the printer 1 (i.e., an example of "an image forming apparatus" of the present invention) is a color LED printer of a direct-transfer tandem type, which has a casing 3 as shown in FIG. 1. A feeder tray 5 is provided on the bottom of the casing 3, and recording media 7 (e.g., paper sheets) are stacked on the feeder tray 5.

The recording media 7 are pressed against a pickup roller 13 by a platen 9. The pickup roller 13 forwards the top one of the recording media 7 to registration rollers 17, which forward the recording medium 7 to a belt unit 21. If the recording medium 7 is obliquely directed, it is corrected by the registration rollers 17 before forwarded to the belt unit 21.

An image forming section 19 includes the belt unit 21 (as an example of a conveyor means), LED exposure units 23 (as an example of an exposure means), processing units 25, a fixation unit 28 and the like. In the present aspect, at least the LED exposure unit 23 and the processing unit 25 correspond to an example of "an image forming portion" of the present invention.

The belt unit 21 includes a belt 31, which is disposed between a pair of support rollers 27, 29. The belt 31 is driven by rotation of the backside support roller 29, for example. Thereby, the belt 31 rotates in anticlockwise direction in FIG. 1, so as to convey the recording medium 7 (forwarded thereto) backward.

The LED exposure units 23 (i.e., 23K, 23C, 23M and 23Y) are provided for respective colors (i.e., black, cyan, magenta and yellow), each of which includes a plurality of light emitting diodes (not shown) arranged in line along the axial direction of a photoconductor 33. The light emitting diodes of each LED exposure unit 23 are controlled based on image data of the corresponding color so as to switch between ON and OFF. Thereby, light is radiated to the surface of the photoconductor 33 so that an electrostatic latent image is formed on the photoconductor 33.

The processing units 25 (i.e., 25K, 25C, 25M and 25Y) are provided for respective colors (i.e., black, cyan, magenta and yellow). The processing units 25 have the same construction, but differ in color of toner (as an example of a colorant). Hereinafter, the suffixes K (Black), C (Cyan), M (Magenta) and Y (Yellow) can be used to indicate which colors can be associated with processing units 25, photoconductors 33 or the like.

Each processing unit 25 includes a photoconductor 33 (as an example of "a rotator" or "a carrier"), a charger 35, a developer cartridge 37 and the like. The developer cartridge 37 includes a toner container 39, a developer roller 41 (as an example of a developer image carrier) and the like. The toner container 39 holds toner therein, which is suitably supplied onto the developer roller 41.

The surface of the photoconductor 33 is charged homogeneously and positively by the charger 35, and thereafter is exposed to light L from the LED exposure unit 23 as described above. Thereby, an electrostatic latent image (corresponding to an image of the color to be formed on the recording medium 7) is formed on the surface of the photoconductor 33. The electrostatic latent image is an example of "an image" of the present invention.

Next, the toner on the developer roller 41 is supplied to the surface of the photoconductor 33 so as to adhere to the electrostatic latent image. Thus, the electrostatic latent image of each color is visualized as a toner image of the color on the photoconductor 33.

While the recording medium 7 (being conveyed by the belt 31) passes between each photoconductor 33 and the corresponding transfer roller 43 (as an example of a transfer means), a negative transfer bias is applied to the transfer roller 43. Thereby, the toner images on the respective photoconductors 33 are sequentially transferred to the recording medium 7, which is then forwarded to the fixation unit 28.

Using a heating roller 45 and a pressure roller 47, the fixation unit 28 heats the recording medium 7 that has the resultant toner image, while forwarding it. Thereby, the toner image is thermally fixed to the recording medium 7. After passing through the fixation unit 28, the recording medium 7 is ejected onto a catch tray 51 by discharge rollers 49.

(Drive Mechanism for Photoconductor)

Figure 2:
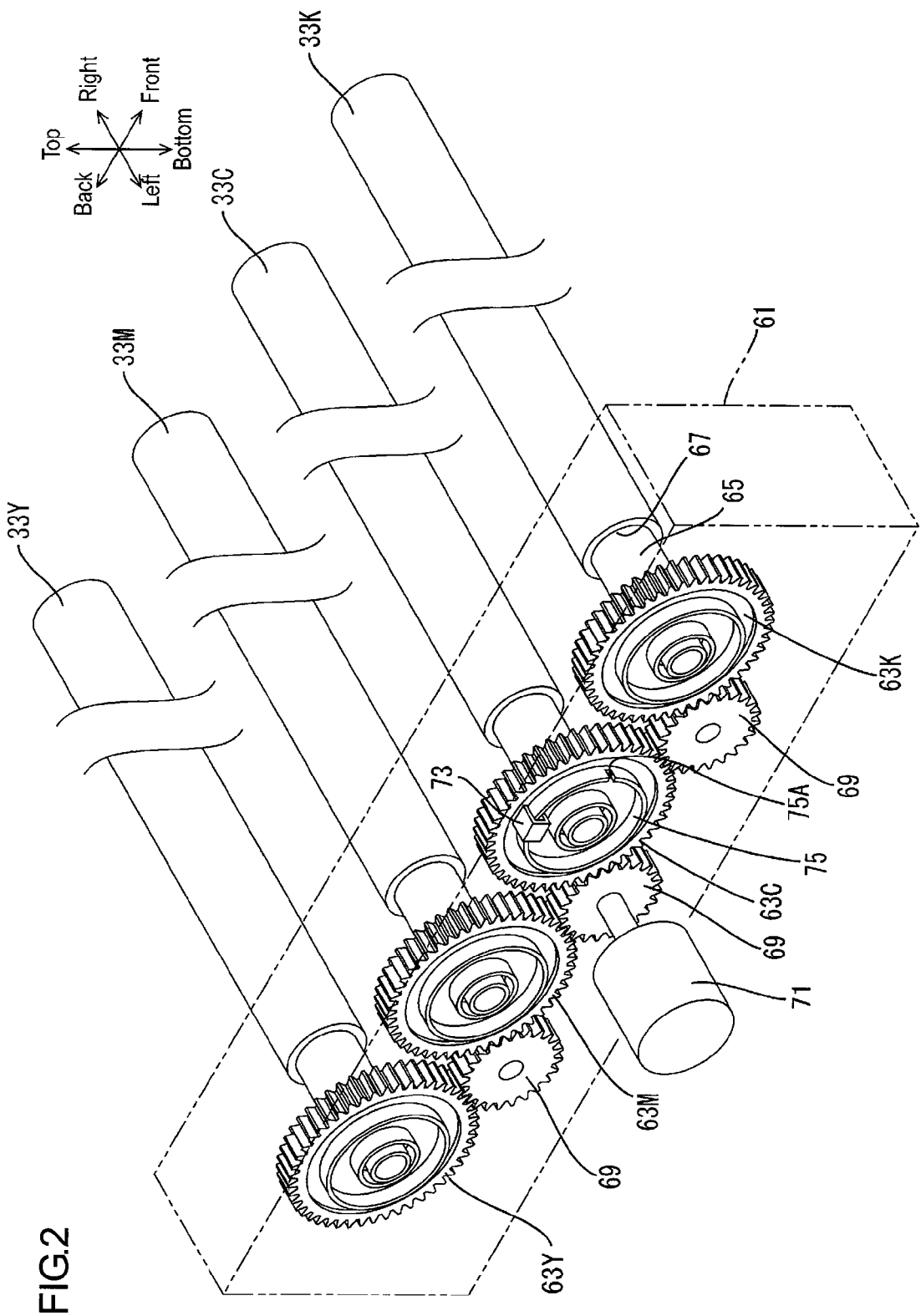
FIG. 2 is a schematic perspective view of the internal structure of a drive unit.

FIG. 2 is a schematic perspective view of the internal structure of a drive unit 61 provided for driving the photoconductors 33 to rotation. The drive unit 61 is disposed on one lateral side of the photoconductors 33, and includes drive gears 63 (i.e., 63K, 63C, 63M and 63Y) provided for respective photoconductors 33 (i.e., 33K, 33C, 33M and 33Y).

Each drive gear 63 is coaxially connected to the corresponding photoconductor 33 by a coupling mechanism. Specifically, an engaging portion 65, coaxially projecting from the drive gear 63, is fitted into a recess 67 formed on the end of the photoconductor 33, so that the drive gear 63 and the photoconductor 33 can rotate in unison when the drive gear 63 is driven to rotation.

The engaging portion 65 is movable between the engaged position shown in FIG. 2 and the detached position. The engaging portion 65 at the detached position is detached from the photoconductor 33. The engaging portion 65 is moved from the engaged position to the detached position, for example, at the time of replacement of the processing unit 25, so that the processing unit 25 can be removed from the casing 3.

Two adjacent drive gears 63 are coupled via an intermediate gear 69. In the present aspect, the middle intermediate gear 69 that connects between the drive gears 63C and 63M can be driven by a motor 71. The drive gears 63 (and therefore the photoconductors 33 connected thereto) rotate concurrently, when the middle intermediate gear 69 is driven to rotation.

An origin sensor 73 (i.e., an example of "a detecting portion" of the present invention) is disposed on one (e.g., the drive gear 63C in the present aspect) of the drive gears 63. The origin sensor 73 is provided for detecting whether the current phase of the rotating drive gear 63C has reached a predetermined detecting phase point P(0) (or an origin phase point).

The term "Phase" is applied to a cyclic motion such as an oscillating motion or a wave motion, and that means a point within a cycle which is measured from the origin and expressed as an elapsed time or a rotational angle.

Specifically, a slit 75A is formed on a circular rib portion 75 that is provided on the drive gear 63C and around the rotating shaft thereof. The origin sensor 73 is an optical transmission sensor having a light emitting element and a light receiving element which are arranged on the opposite side of the rib portion 75 from each other.

When the slit 75A is not in the detection area of the origin sensor 73, the level of light received by the light receiving element is relatively low because light from the light emitting element is blocked by the rib portion 75. When the slit 75A is in the detection area (i.e., when the current phase of the drive gear 63C has reached the detecting phase point P(0)), the level of light received by the light receiving element is relatively high because light from the light emitting element is not blocked.

The origin sensor 73 outputs a detection signal SA (See FIG. 3) indicating the received light level, in order to inform a CPU 77 (described below) when the origin sensor 73 detects that the current phase of the drive gear 63C has reached the detecting phase point P(0).

The time when the detecting phase point P(0) has been reached should be detected on respective drive gears 63, because a correction process for scanning line interval is executed individually for respective colors (or for respective photoconductors) as described below. Therefore, an origin sensor can be provided separately for each drive gear 63, so that the time when the detecting phase point P(0) has been reached is detected individually for each drive gear 63.

However, the cost of the increased number of origin sensors is high, and accordingly the origin sensor 73 is provided solely on one drive gear 63C in the present aspect. This would cause no problem, because the four drive gears 63 are driven by the common drive motor 71 in the present aspect.

If the drive unit 61 is designed so that the four drive gears 63 simultaneously reach the detecting phase point P (0), it can be detected, directly or indirectly based on the time when one drive gear 63C has reached the detecting phase point P(0), that the four drive gears 63 have reached the detecting phase point P(0).

Each drive gear 63 and the photoconductor 33 connected thereto rotate in unison as described above, and therefore they are considered to be in phase with each other (during rotation). Therefore, the time when the photoconductor 33 has reached the detecting phase point P(0) can be detected indirectly based on the time when the origin sensor 73 detects that the drive gear 63C has reached the detecting phase point P(0).

Hereinafter, "when the drive gear 63 has reached the detecting phase point P(0)" is sometimes used interchangeably with "when the photoconductor 33 has reached the detecting phase point P (0)".

(Electrical Configuration of Printer)

Figure 3:
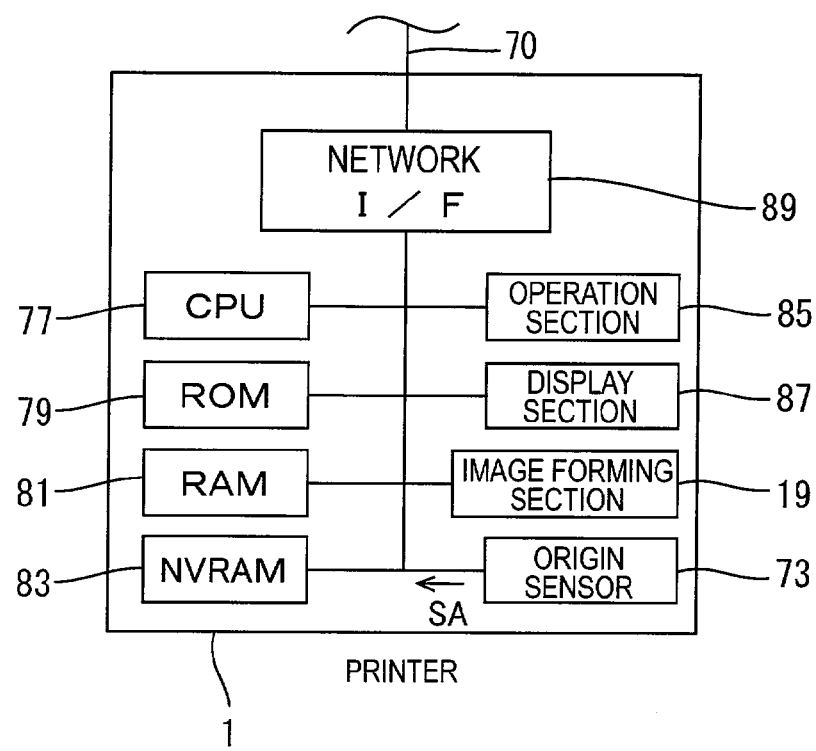
FIG. 3 is a block diagram showing the electrical configuration of the printer.

FIG. 3 is a block diagram showing the electrical configuration of the printer 1. The printer 1 includes a CPU 77, a ROM 79, a RAM 81, an NVRAM 83 (as an example of a storage portion), an operation section 85, a display section 87, the above-described image forming section 19, a network interface 89, the origin sensor 73 and the like.

Various programs for controlling the operation of the printer 1 are stored in the ROM 79. The CPU 77 controls the operation of the printer 1 based on the programs retrieved from the ROM 79, while storing the processing results in the RAM 81 and/or the NVRAM 83.

The operation section 85 includes a plurality of buttons, which enable a user to perform various input operations, such as an operation for a printing request. The display section 87 can include a liquid-crystal display and indicator lamps. Thereby, various setting screens, the operating condition and the like can be displayed. The network interface 89 can be connected to an external computer (not shown) or the like, via a communication line 70, in order to enable mutual data communication.

(Change Characteristics Information)

Hereinafter, the meanings of terms used in the following explanation will be described.

(a) "Write Time Interval T1" is a time interval between the start of a scanning line and that of the next scanning line when the LED exposure unit 23 scans the photoconductor 33.

(b) "Scanning Line Interval B" is a distance in the circumferential direction (secondary scanning direction) of the photoconductor 33 between a scanning line and the next scanning line, measured in an electrostatic latent image on the photoconductor 33 (or a distance in the secondary scanning direction between a scanning line and the next scanning line, measured in an image transferred to a recording medium 7).

Note that the starting position of each scanning line on the photoconductor 33 (or the corresponding position on the recording medium 7) is an example of "an image forming position".

(c) "Regulation Speed V0" is a rotational speed of the photoconductor 33 or the drive gear 63, prescribed according to the design. The regulation speed V0 can be changed depending on printing conditions such as a print speed, print resolution, or material or quality of a recording medium 7.

(d) "Regulation Line Interval B0" is a proper scanning line interval determined based on printing conditions such as a print resolution. Conversely, an electrostatic latent image can be formed while satisfying the above printing conditions, if the scanning line interval is consistently adjusted to the regulation line interval B0.

(e) "Regulation Time Interval T0" is a theoretical write time interval, at which line scanning is performed so that the scanning line interval is adjusted to the regulation line interval B0 while the drive gear 63 rotates at a constant speed corresponding to the regulation speed V0. That is, the regulation time interval T0 is determined as (B0/V0) where "B0" is the regulation line interval and "V0" is the regulation speed.

(f) "Phase Point Number H" is a number assigned to a phase point within one cycle of rotation of the drive gear 63. The phase point number H is an integer from 0 to (HM−1). The phase points P(0) to P(HM−1) correspond to the starting points of respective scanning lines on the photoconductor 33.

Figure 4:
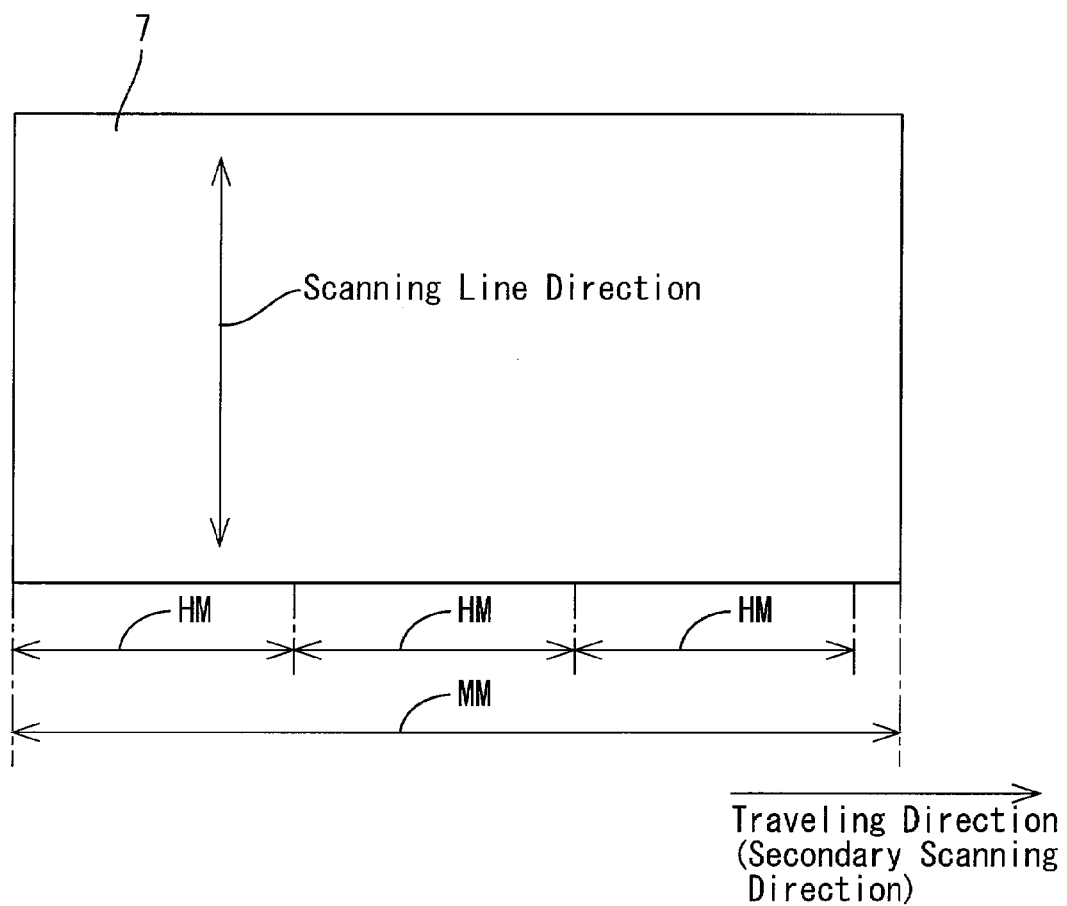
FIG. 4 is a schematic diagram for explanation of Number of lines per cycle and Number of lines per sheet.

(g) "Number of Lines per cycle HM" is the total number of scanning lines associated with one revolution of the drive gear 63 (See FIG. 4).

(h) "Number of Lines per sheet MM" is the total number of scanning lines associated with one sheet of recording media 7 (See FIG. 4). Number of lines per sheet MM will be changed depending on the size of the sheet in its traveling direction.

(i) "Base Time Point" is a reference time point used for estimating the time when each phase point is reached. In the present aspect, the base time point is initially set to an actual time point corresponding to the detecting phase point P(0) (i.e., the time when the origin sensor 73 first detects the detecting phase point P(0)).

During the second or later cycle, the base time point is set to the time when one line scanning is first started (i.e., the first writing time) after the origin sensor 73 detects the detecting phase point P(0), as described below.

In the present aspect, the recording medium 7 traveling with rotation of the belt 31 will be sequentially synchronized with rotation of the photoconductors 33, as can be seen from FIG. 1. That is, the traveling speed of the recording medium 7 will coincide with the rotational speed V of the photoconductor 33.

Therefore, a proper image (i.e., an image in which image lines corresponding to respective scanning lines are arranged uniformly) on the recording medium 7 can be achieved by forming a proper electrostatic latent image (i.e., an electrostatic latent image in which the scanning line interval B uniformly coincides with the regulation line interval B0) on each photoconductor 33.

That is, during line scanning, a new scanning line should be started when the photoconductor 33 has rotated a distance of a phase shift amount ΔP (corresponding to the regulation line interval B0) since start of the previous scanning line, in order to form a proper electrostatic latent image on the photoconductor 33.

First, assume that the drive gear 63 rotates at a constant speed corresponding to the regulation speed V0. In this case, the drive gear 63 rotates a constant distance (corresponding to the phase shift amount ΔP, which is equal to one cycle divided by HM) during a time interval corresponding to the regulation time interval T0, as shown in the uppermost chart of FIG. 5.

Figure 5:
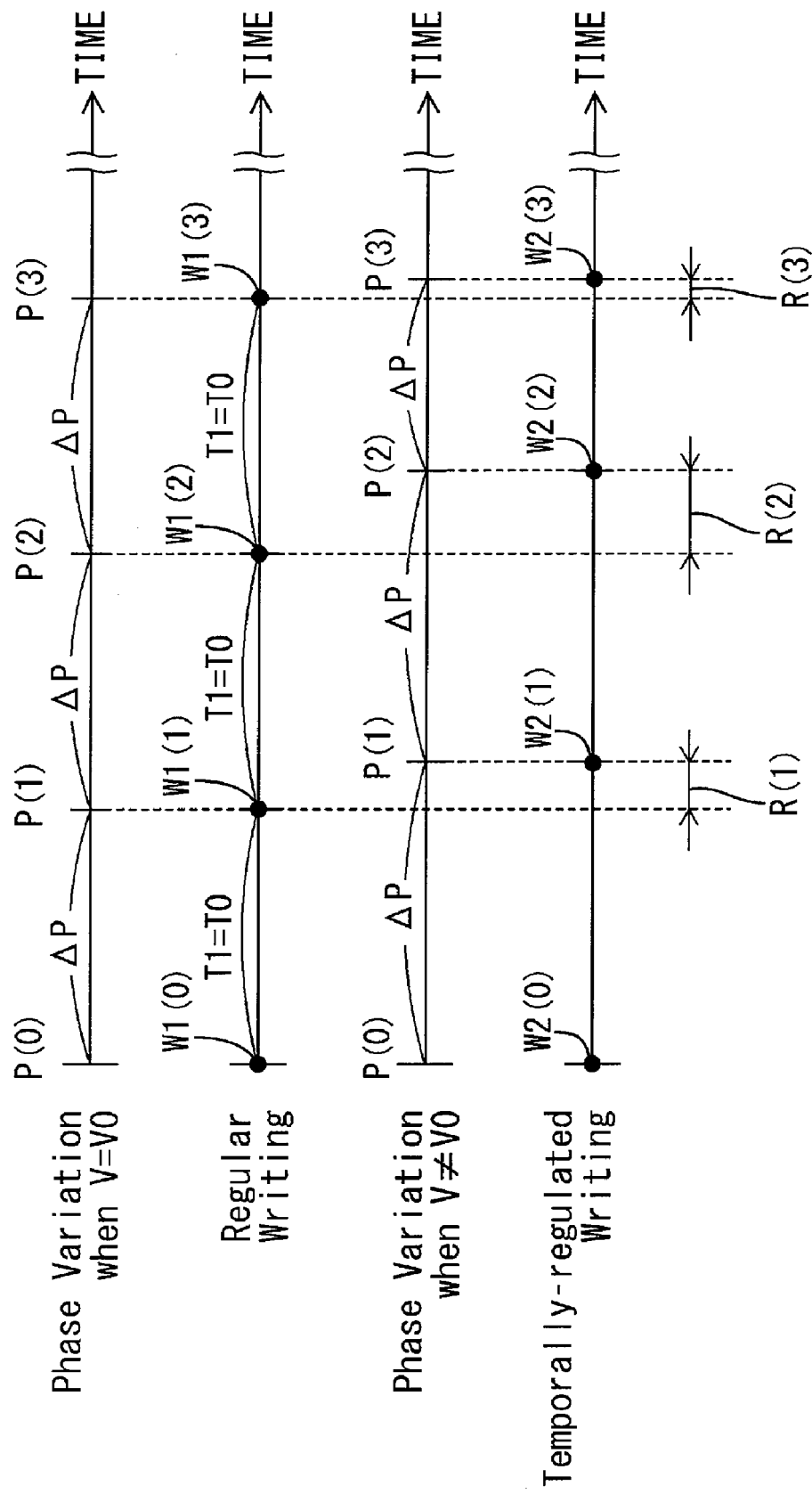
FIG. 5 is a timing chart showing the difference between regular writing and temporally-regulated writing.

Therefore, a proper electrostatic latent image can be achieved by consistently adjusting the write time interval T1 to the regulation time interval T0 during line scanning, as shown in the second chart of FIG. 5. That is, regular writing (i.e., line scanning at a regular time interval corresponding to the regulation time interval T0) enables a proper electrostatic latent image, in this case.

Hereinafter, starting time for each scanning line during regular writing is referred to as "regular writing time W1(H)". The series of phase points (which has the origin at the detecting phase point P(0), and in which the phase difference between two adjacent phase points is set to ΔP) is hereinafter referred to collectively as "phase points P(H)", or individually as "phase point P(1), P(2), P(3), . . . , P (HM−1)".

The photoconductor 33 or the drive gear 63 actually has cyclic variation in rotational speed. Therefore, the distance of a phase shift amount that the drive gear 63 rotates during a time interval (corresponding to the regulation time interval T0) varies depending on the rotational speed of the drive gear 63, as shown in the third chart of FIG. 5.

In this case, the actual phase of the drive gear 63 at the start of each scanning line may fail to coincide with the phase point at which the scanning line should be started, if the write time interval T1 is consistently set to the regulation time interval T0 during line scanning (i.e., if scanning lines are started at a regular time interval corresponding to the regulation time interval T0 as in the above regular writing). This could result in an odd image, in which the scanning line interval has variation.

Therefore, in order to form a proper electrostatic latent image, the starting time for each scanning line should be corrected or regulated as shown in the fourth chart of FIG. 5. Hereinafter, starting time for each scanning line during the temporally-regulated writing (i.e., line scanning at irregular intervals) is referred to as "corrected writing time W2(H)".

In the preset aspect, the corrected writing time W2(H) is determined using change characteristics information, as follows. The write time interval T1 at each phase point P(H) during the temporally-regulated writing can be expressed as (B0/V) where "B0" is the regulation line interval and "V" is the rotational speed of the photoconductor 33. That is, during line scanning, the write time interval T1 should change with variation in the rotational speed V of the drive gear 63.

The symbol R(1), R(2) or R(3) in FIG. 5 indicates a correction amount R(H), which is an amount of time used for changing each regular writing time W1(H) into the corrected writing time W2(H).

Specifically, the correction amounts R(1) to R(HM−1) are provided for changing the regular writing times W1(1) to W1(HM−1) into the corrected writing times W2(1) to W2(HM−1), respectively. The correction amount R(0) is provided for correcting the regular writing time W1(0) into the corrected writing time W2(0) during the second or later cycle. Each correction amount R(H) is an example of "a correction parameter".

In the present aspect, the correction amount R(H), used for correcting the regular writing time W1(H) so that the resultant corrected writing time W2(H) lags behind the regular writing time W1(H), has a positive value. Conversely, the correction amount R(H), used for correcting the regular writing time W1(H) so that the resultant corrected writing time W2(H) comes before the regular writing time W1(H), has a negative value.

In the present aspect, the correction amounts R(0) to R(HM−1) are preliminarily determined, and are stored as change characteristics information in the NVRAM 83. During line scanning, the corrected writing time W2(H) is determined based on the change characteristics information.

Figure 6:
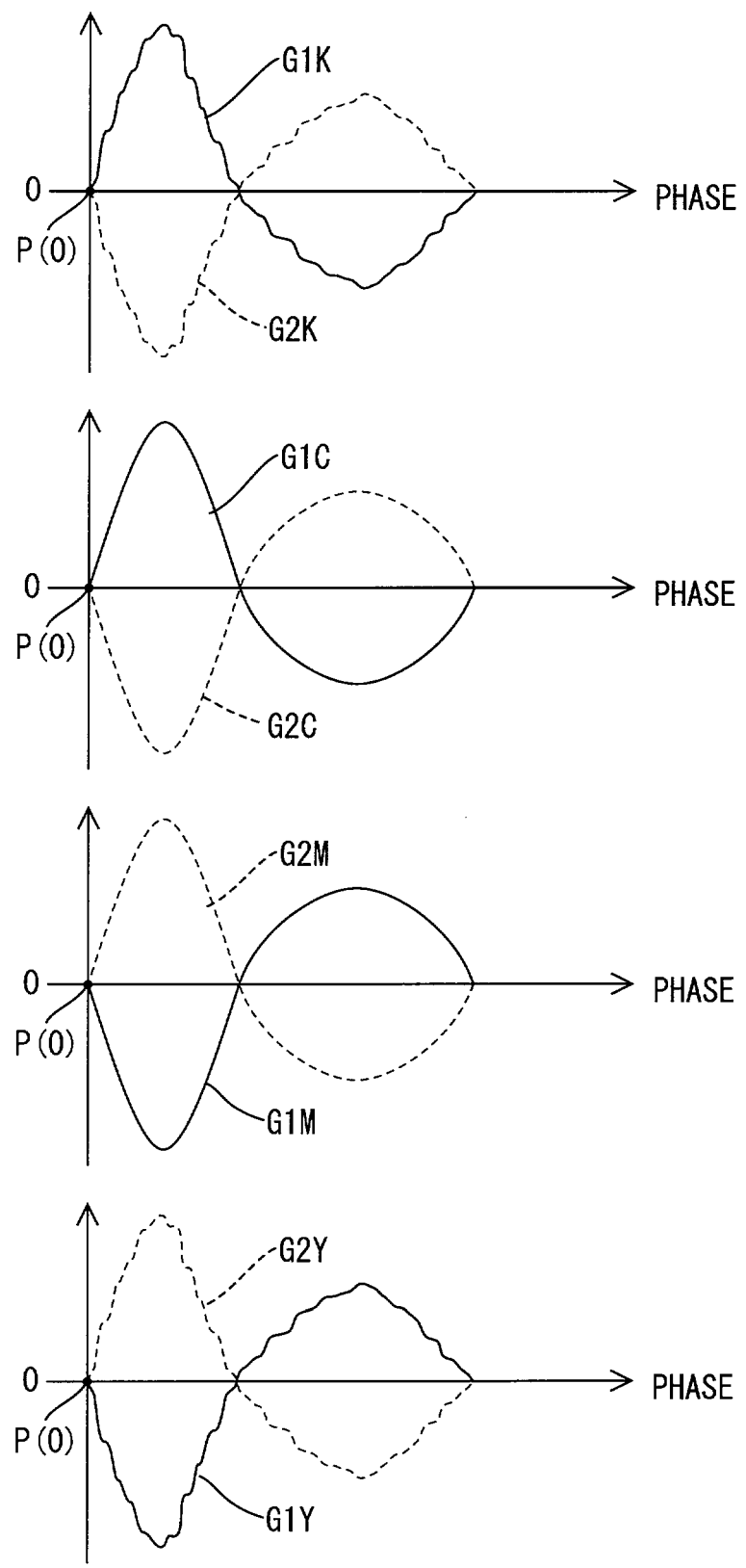
FIG. 6 is a graph showing measured values associated with variation in rotational speed of each drive gear, and distance correction amounts therefore.

Hereinafter, the change characteristics information will be explained in detail. FIG. 6 shows the variation in rotational speed of each drive gear 63 during one cycle. The four graphs in FIG. 6 correspond to the respective drive gears 63.

The solid line G1 (i.e., G1K, G1C, G1M or G1Y) in each graph is generated using measured values of the rotational speed V of the drive gear 63 (i.e., 63K, 63C, 63M or 63Y).

More specifically, the distance difference between the regulation line interval B0 and the scanning line interval B (i.e., the expected actual line interval when the write time interval is set to the regulation time interval T0), caused by the speed difference between the regulation speed V0 and the measured value of the rotational speed V, is calculated for each phase point P(H).

The distance difference is determined by subtracting the regulation line interval B0 from the scanning line interval B. Therefore, the distance difference at a phase point P(H) has a positive value, if the rotational speed V at the phase point P(H) is higher than the regulation speed V0. Conversely, the distance difference at a phase point P(H) has a negative value, if the rotational speed V at the phase point P (H) is lower than the regulation speed V0.

Further, the accumulated distance difference at each phase point P(H) (i.e., sum of the above distance difference at the phase point P(1) to that at the phase point P(H)) is calculated. The solid line G1 is generated by plotting a value of the accumulated distance difference corresponding to each phase point P(H).

The dotted line G2 (i.e., G2K, G2C, G2M or G2Y) in each graph represents the variation of amount of distance correction. More specifically, the distance correction amount for correcting the accumulated distance difference at each phase point P(H) is shown as a point on the dotted line G2. Therefore, The dotted line G2 is symmetrical to the solid line G1 with respect to Zero line (or Phase axis).

The distance correction amount at each phase point P(H) on the dotted line G2 indicates an amount of distance correction, which should be caused by correction of the regular writing time W1(H) into the corrected writing time W2(H) using the above-described correction amount R(H).

First, consider the case of a phase point P(H) at which the value on the solid line G1 is larger than zero (i.e., at which the accumulated distance difference has a positive value).

If the starting time for a new scanning line is set to the regular writing time W1(H) at the phase point P(H), the distance between P(0) and the starting point of the scanning line in the resultant electrostatic latent image could be longer than the actual distance between P(0) and P(H) on the photoconductor 33 (which can be determined as (B0*H)).

Therefore, the starting time for a new scanning line should be corrected by a negative distance correction amount (shown by the dotted line G2 in FIG. 6) at the phase point P(H), so that the resultant distance between P(0) and the starting point of the scanning line becomes shorter than that before corrected.

That is, the corrected writing time W2(H) should be set to a time point earlier than the regular writing time W1(H), and therefore the correction amount R(H) at the phase point P(H) should be set to a negative value.

Thus, when the accumulated distance difference at a phase point P(H) (shown by the solid line G1 in FIG. 6) has a positive value, the starting time for a new scanning line is corrected using a correction amount R(H) having a negative value, so that the corrected writing time W2(H) comes before the regular writing time W1(H), in the present aspect.

Next, consider the case of a phase point P(H) at which the value on the solid line G1 is smaller than zero (i.e., at which the accumulated distance difference has a negative value).

If the starting time for a new scanning line is set to the regular writing time W1(H) at the phase point P(H), the distance between P(0) and the staring point of the scanning line in the resultant electrostatic latent image could be shorter than the actual distance between P(0) and P(H) on the photoconductor 33.

Therefore, the starting time for a new scanning line should be corrected by a positive distance correction amount (shown by the dotted line G2 in FIG. 6) at the phase point P(H), so that the resultant distance between P(0) and the starting point of the scanning line becomes longer than that before corrected.

That is, the corrected writing time W2(H) should be set to a time point later than the regular writing time W1(H), and therefore the correction amount R(H) at the phase point P(H) should be set to a positive value.

Thus, in the case that the accumulated distance difference at a phase point P(H) (shown by the solid line G1 in FIG. 6) has a negative value, the starting time for a new scanning line is corrected using a correction amount R(H) having a positive value, so that the corrected writing time W2(H) lags behind the regular writing time W1(H), in the present aspect.

The correction amount R(H) for each phase point P(H) can be derived from the distance correction amount (shown by the dotted line G2 in FIG. 6) and the above-described measured value of the rotational speed V at the phase point P (H). The derived correction amounts R(H) (i.e., R(0) to R(HM−1)) are stored as the change characteristics information in the NVRAM 83.

More specifically, the correction amounts R(H) are derived for each drive gear 63, and are stored as a table showing a correspondence relation between the phase point numbers (H) and the correction amounts R(H) where H is an integer from 0 to (HM−1), as shown in FIG. 7.

(Correction Process for Scanning Line Interval)

Figure 8:
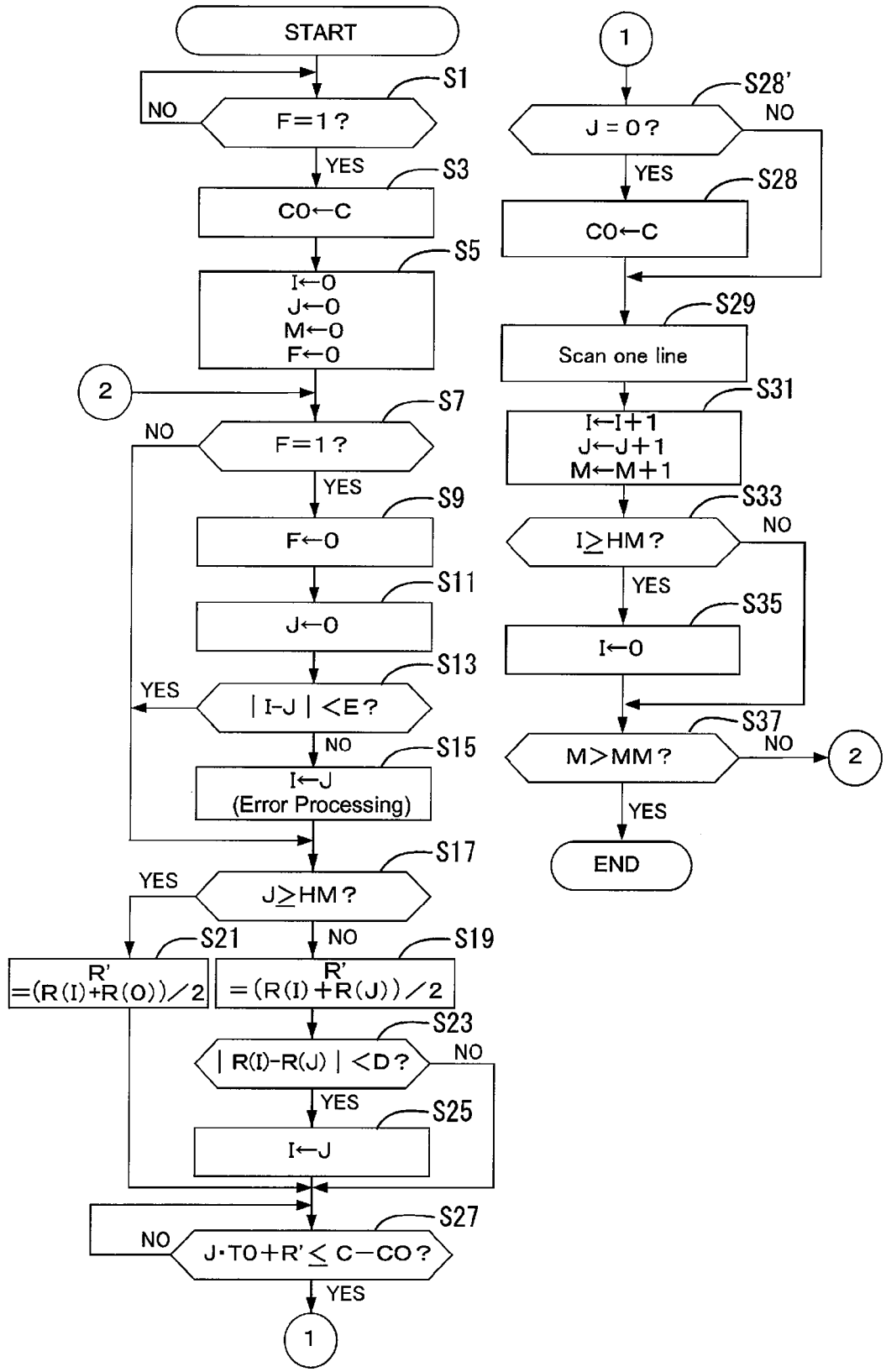
FIG. 8 is a flowchart of a line scanning process including a correction process.

FIG. 8 shows a line scanning process that includes a correction process for the scanning line interval. The CPU 77 executes the line scanning process for forming an electrostatic latent image on the photoconductor 33 based on image data of each color provided for one sheet of recording media 7.

In the present aspect, the correction process for the scanning line interval will not be executed during monochrome printing performed using a single processing unit 25 (e.g., processing unit 25K for black).

That is, the correction process is executed during color printing performed using two or more of processing units 25. This is because the effect of variation in scanning line interval B due to variation in rotational speed V of the photoconductor 33 can appear as a color shift prominently in a color image formed by superimposing images of respective colors.

In the present aspect, the correction process is executed individually for respective colors, using the change characteristics information provided individually for respective colors. The following explanation points to the correction process executed for a cyan image, as an example. The correction process can be executed for the other colors in a similar manner.

(1) Outline of Correction Process

If the CPU 77 receives image data, for example, from an external computer via the network interface 89, or receives a printing request from a user via the operation section 85, it starts a printing process by causing rotation of the photoconductors 33, belt 31 and the like.

The CPU 77 executes the line scanning process shown in FIG. 8, while the LED exposure unit 23C is scanning the photoconductor 33C. The line scanning process includes the correction process for the scanning line interval as described above, and thereby the scanning line interval B in the resultant electrostatic latent image on the photoconductor 33C is consistently adjusted to the regulation line interval B0, based on the change characteristics information.

Referring to FIG. 8, the CPU 77 determines at step S1 whether a detection flag F is set to 1 (F=1) or not. The detection flag F is initially set to 0, and thereafter is set to 1 in response to the detection signal SA, which is outputted from the origin sensor 73 for indicating that the current phase of the photoconductor 33C has reached the detecting phase point P(0).

If it is determined that the detection flag F is set to 1 (i.e., "YES" is determined at step S1), the process proceeds to step S3. Thus, the CPU 77 starts the line scanning when the detecting phase point (or origin phase point) P(0) is detected by the origin sensor 73.

At step S3, the count value of a current time counter C (or an internal clock) is assigned to the reference time C0, and thereby the reference time C0 (or the base time point) is set to the current time.

Next, at step S5, the detection flag F is cleared or set to 0. Further, a first phase counter (I), a second phase counter (J) and a line counter (M) are initialized.

At step S6, the CPU 77 instructs the LED exposure unit 23C to scan one line. Thereby, scan of the first line is started from the detecting phase point P(0) of the photoconductor 33C. At step S6', the first phase counter (I), the second phase counter (J) and the line counter (M) are incremented by one (i.e., set to one).

During the following process, both of the first phase counter (I) and the second phase counter (J) are incremented when a new scanning line is started. The first phase counter (I) is reset to 0 when its count value has reached Number of lines per cycle HM. The second phase counter (J) is reset to 0 when the origin sensor 73 has detected the detecting phase point P(0).

Therefore, the first phase counter (I) will not exceed Number of lines per cycle HM, while the second phase counter (J) can exceed Number of lines per cycle HM. The count values of the first phase counter (I) and the second phase counter (J) are equal to each other, at some stages of the line scanning process such as the initial stage.

They could become different, when scanning of HM lines is completed. The first phase counter (I) may be shifted to have the same value as the second phase counter (J) at an appropriate time during the line scanning process.

The CPU 77 retrieves some of the correction amounts R(H) from the change characteristics information based on the first phase counter (I) and the second phase counter (J), and determines the corrected writing time W2 by correcting the regular writing time W1 using the retrieved correction amounts.

Thus, in the present aspect, an estimated phase point based the first phase counter (I) (hereinafter, referred to as "a first estimated phase point P1(I)") and another estimated phase point based on the second phase counter (J) (hereinafter, referred to as "a second estimated phase point P2(J)") are used for determining the correction amount for the writing time of each scanning line.

Specifically, returning to FIG. 8, it is determined at step S7 whether the detection flag F is set to 1 or not, when S6' is completed. The detection flag F has been cleared at step S5, and therefore "NO" is determined at step S7. Then, the process proceeds to step S17, where it is determined whether the count value of the second phase counter (J) is equal to or larger than Number of lines per cycle HM".

The count value of the second phase counter (J) will be smaller than Number of lines per cycle HM, because the present line scanning process is just started. Therefore, "NO" is determined at step S17, and the process proceeds to step S19.

At step S19, the CPU 77 retrieves the correction amount R(I) corresponding to a phase point number equal to the count value of the first phase counter (I), and the correction amount R(J) corresponding to a phase point number equal to the count value of the second phase counter (J) from the change characteristics information. The correction amount R(I) is an example of "a designated parameter", while the correction amount R(J) is an example of "a reference parameter".

The CPU 77 calculates an adjusted value R' according to the following formula:

$$R' = (R(I) + R(J))/2.$$

Note that the count values of the first phase counter (I) and the second phase counter (J) are equal to each other at the initial stage of the line scanning process (i.e., before the first phase counter (I) reaches Number of lines per cycle HM). In this case, the calculated adjusted value R' is equal to both of the correction amounts R(I) and R(J).

Next, it is determined at step S23 whether the difference between the correction amounts R(I) and R(J) is smaller than a predetermined value D (i.e., whether |R(I)−R(J)|<D is satisfied). If the difference is not smaller than the predetermined value (i.e., "NO" is determined at step S23), the process proceeds to step S27.

If the difference is smaller than the predetermined value D (i.e., "YES" is determined at step S23), the count value of the second phase pointer (J) is assigned to the first phase pointer (I) at step S25.

Thus, the correction amount R(I) designated based on the first phase counter (I) is shifted to the correction amount R(J) designated based on the second phase counter (J) at step S25, so that the adjusted value R' is determined as the correction amount R(J) for then J (i.e., the current J plus one, or zero) when step S19 is executed again. The CPU 77 executing steps S23 and S25 functions as "a second shifting portion" of the present invention.

Next, at step S27, the CPU 77 calculates the theoretical time interval (TTI) between the phase point P(0) and the corrected writing time W2(J). In the present aspect, the theoretical time interval TTI is determined according to the following formula:

$$TTI = J \cdot T0 + R'$$

Where "J" is the count value of the second phase counter (J) and "T0" is the regulation time interval.

Further, the CPU 77 calculates an elapsed time since the reference time C0. The elapsed time is determined by subtracting the reference time C0 from the count value of the current time counter C (or the internal clock). Thus, the CPU 77 can calculate the elapsed time based on the internal clock, and thereby functions as "a timer portion".

The CPU 77 determines whether the calculated elapsed time is equal to or larger than the theoretical time interval TTI. If it is determined that the calculated elapsed time has not yet reached the theoretical time interval TTI (i.e., "NO" is determined at step S27), step S27 is executed again. That is, step S27 is repeated until the calculated elapsed time reaches the theoretical time interval TTI.

If the calculated elapsed time has reached the theoretical time interval TTI (i.e., "YES" is determined at step S27), the current phase of the drive gear 63 is estimated to reach the phase point P (J) (i.e., the starting point for next scanning line).

Therefore, the process proceeds to step S29, where the CPU 77 instructs the LED exposure unit 23C to scan one line. The CPU 77 executing steps S27 and S29 functions as "a correcting portion" of the present invention.

The reference time C0 is set to the current time at step S28 before step S29, if it is determined at step S28' that the count value of the second phase pointer (J) is equal to "0". That is, the count value of the current time counter C is assigned to the reference time C0 if J=0. Thereby, the base time point is set to the time when one line scanning at step S29 is first started after detection of the detecting phase point P(0).

Next, at step S31, the first phase counter (I), the second phase counter (J) and the line counter (M) are incremented by one. At step S33, it is determined whether the count value of the first phase counter (I) has reached Number of lines per cycle HM. If it is determined that the count value of the first phase counter (I) has not yet reached Number of lines per cycle HM (i.e., "NO" is determined at step S33), the process proceeds to step S37.

If it is determined that the first phase counter (I) has reached Number of lines per cycle HM (i.e., "YES" is determined at step S33), the first phase counter (I) is initialized or set to "0" at step S35, and thereafter the process proceeds to step S37.

At step S37, it is determined whether the count value of the line counter M exceeds Number of lines per sheet MM (i.e., whether the line scanning based on image data associated with one sheet of recording media 7 is finished).

If it is determined that the line scanning is not finished (i.e., "NO" is determined at step S37), the process returns to step S7. If it is determined that the line scanning is finished (i.e., "YES" is determined at step S37), the present process terminates.

(2) Error in Phase Estimation

In the present aspect, the origin sensor 73 can directly detect when the current phase of the drive gear 63 (or the photoconductor 33C) has reached the detecting phase point P(0).

However, as for the other phase points P(1) to P(HM−1), the time when the phase point has been reached cannot be detected directly, and therefore that is estimated by the CPU 77 based on the calculated elapsed time since the base time point (or reference time C0), as described above.

More specifically, the CPU 77 holds the first estimated phase point P1(I) based on the first phase counter (I) and the second estimated phase point P2(J) based on the second phase counter (J), as described above. The first estimated phase point P1(I) is reset to P(0) when scanning of HM lines is completed, while the second estimated phase point P2(J) is reset to P(0) when the origin sensor 73 detects the detecting phase point P(0) of the drive gear 63C.

If the internal clock (or the current time counter C) can count time accurately, both of the first estimated phase point P1(I) and the second estimated phase point P2(J) will consistently coincide with the actual phase of the drive gear 63C, and therefore be reset to P(0) at the same time.

In this case, the correction amounts R(H) in the change characteristics information can be appropriately designated at the respective actual phase points P (H) even if the first estimated phase point P1(I) is solely used, and thereby the scanning line interval B can be consistently adjusted to the regulation line interval B0 during line scanning.

However, the internal clock fails to count time accurately in some cases, for example, due to a cheap oscillator that can be used therein for generating clock signals, or due to variation in pulse interval caused by variation in internal temperature of the printer 1.

In this case, the estimated phase points based on the internal clock may have an error. That is, the first estimated phase point P1(I) may differ from the actual phase of the drive gear 63C. The error will be accumulated as the photoconductor 33C rotates, i.e., in a succession of estimation.

Consequently, the correction amounts R(H) in the change characteristics information may be inappropriately designated based on the inaccurately estimated phase points, if the first estimated phase point P1(I) is solely used. Thereby, the scanning line interval B could fail to be consistently adjusted to the regulation line interval B0 during line scanning.

On the other hand, the second estimated phase point P2(J) may also have an error, because it is determined based on the internal clock. However, the second estimated phase point P2(J) is corrected or reset to P (0) when the origin sensor 73 detects the detecting phase point P(0) of the drive gear 63C, as described above. Therefore, the second estimated phase point P2(J) can be more accurate than the first estimated phase point P1(I), especially when the origin sensor 73 has detected the detecting phase point P(0).

For this reason, in the present aspect, the adjusted value R' for correcting the writing time is determined using the correction amounts R(I) and R(J), which are respectively designated based on the first estimated phase point P1(I) and the second estimated phase point P2(J). Further, the first estimated phase point P1(I) is corrected or shifted to be equal to the second estimated phase point P2(J), at an appropriate time during the correction process of the line scanning process.

(3) Measure Against Phase Estimation Error

The details of the process for correcting phase estimation error will be hereinafter explained.

(A) When Estimated Phase is Ahead of Actual Phase

Figure 9:
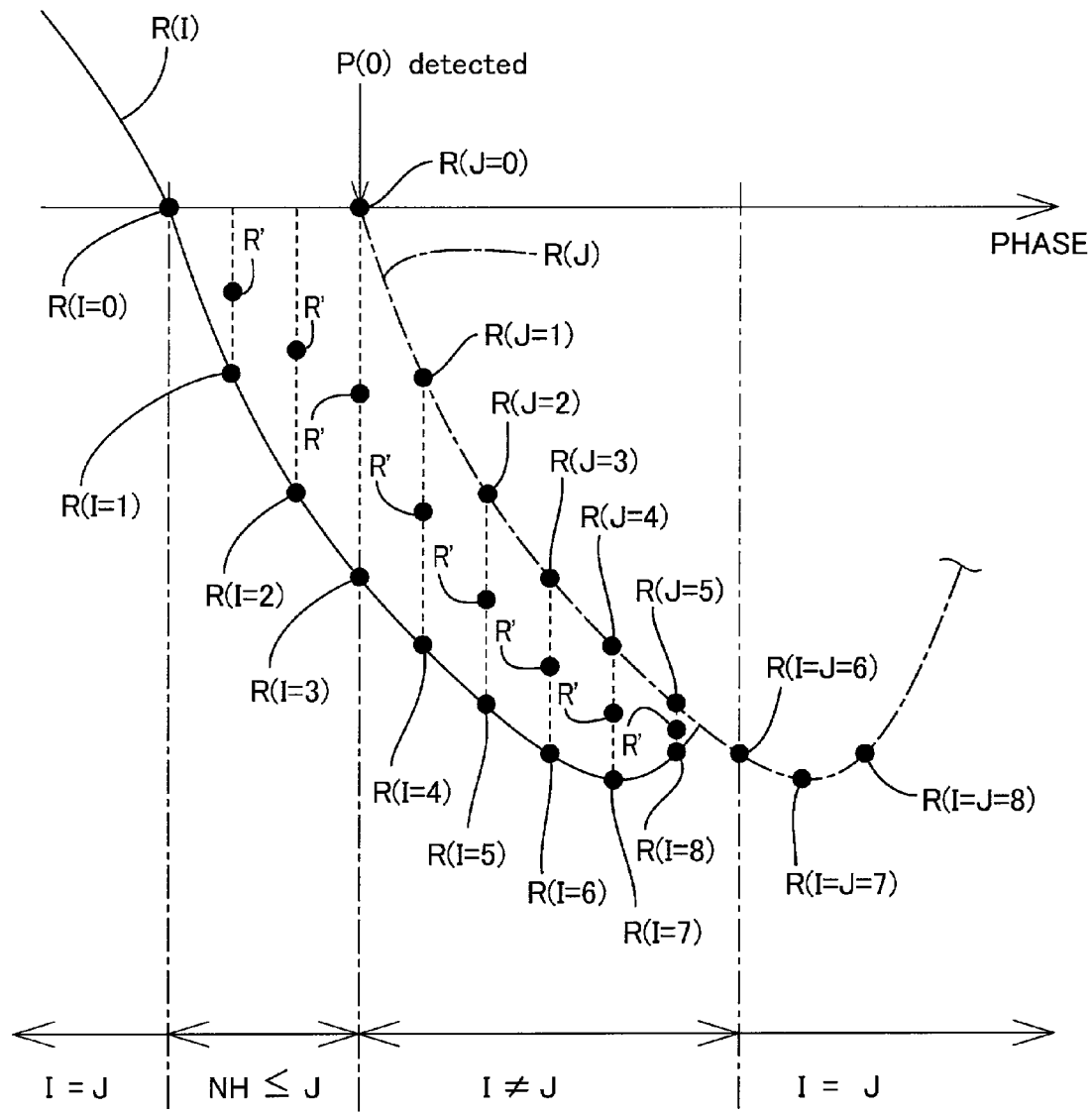
FIG. 9 is a graph showing variation in correction amounts when estimated phase is ahead of actual phase.

In the case that the internal clock (or the current time counter C) is prone to be ahead of the actual time, the CPU 77 determines that the first estimated phase point P1(I) has reached the detecting phase point P(0) when the actual phase of the drive gear 63C has not yet reached the detecting phase point P(0), as shown in FIG. 9.

That is, before the drive gear 63C actually reaches the detecting phase point P (0), the count value of the first phase counter (I) reaches Number of lines per cycle HM (i.e., "YES" is determined at step S33) and therefore is reset to "0" at step S35.

If the count value of the line counter (M) has not yet reached Number of lines per sheet MM (i.e., "NO" is determined at step S37) and the detecting phase point P(0) has still not been reached (i.e., "NO" is determined at step S7), the process proceeds to step S17.

The count value of the second phase counter (J) may be currently equal to or larger than Number of lines per cycle HM. Then "YES" is determined at step S17, and the process proceeds to step S21.

At step S21, the CPU 77 retrieves the correction amount R(I) corresponding to a phase point number (I) equal to the count value of the first phase counter (I) and the correction amount R(0) corresponding to the phase point number (0), from the change characteristics information. The correction amount R(I) is an example of "a designated parameter", while the correction amount R(0) is an example of "a reference parameter".

Note that the change characteristics information does not include a correction amount corresponding to a phase point number equal to or larger than Number of lines per cycle HM. Therefore, the correction amount R(0) is retrieved as a reference parameter from the change characteristics information, when the count value of the second phase counter (J) is equal to or larger than Number of lines per cycle HM.

Further, the CPU j7 calculates an adjusted value R' according to the following formula:

$$R'=(R(I)+R(0))/2.$$

Thus, the adjusted value R' is determined as a value intermediate between the correction amounts R(I) and R(0) (or more specifically, as the average of the correction amounts R(I) and R(0), in the present aspect).

The corrected writing time W2(J) is determined at step S27 by correcting the regular writing time W1(J) using the adjusted value R'. Thereby, at step S29, the next scanning line is started at a time shifted from the regular writing time W1(J) by the adjusted value R'.

Thus, referring to FIG. 9, the writing time is corrected using the adjusted value R' intermediate between the correction amounts R(I) and R(0), until the origin sensor 73 detects the detecting phase point P (0) after the first estimated phase point P1(I) has reached the detecting phase point P(0). The CPU 77 executing step S19 or S21 functions as "a changing portion" of the present invention.

When the origin sensor 73 detects the detecting phase point P(0) (i.e., "YES" is determined at step S7), the count value of the second phase counter (J) is initialized or reset to "0" at step S11 after the detection flag F is cleared or set to "0" at step S9. Thus, the second phase counter (J) newly starts the count from "0" as shown in FIG. 9, when the detecting phase point P(0) is detected.

In the present aspect, as described above, the CPU 77 determines the second estimated phase point P2(J) (i.e., an estimation of the current phase of the drive gear 63C) based on the count value of the second phase counter (J), which is to be reset to "0" at step S11 when the detecting phase point P(0) is detected.

The CPU 77 further determines the first estimated phase point P1(I) (i.e., another estimation of the current phase of the drive gear 63C as described above) based on the count value of the first phase counter (I), which is to be reset to "0" at step S35 when the count value has reached Number of lines per cycle HM.

The CPU 77 designating the correction amount R(I) based on the count value of the first phase counter (I) is an example of "a first designating portion" of the present invention. The CPU 77 designating the correction amount R(J) based on the count value of the second phase counter (J) is an example of "a second designating portion" of the present invention.

At step S13, it is determined whether the difference between the count values of the first phase counter (I) and the second phase counter (J) is smaller than a reference value E. That is, it is determined at step S13 whether the difference between the first estimated phase point P1(I) and the second estimated phase point P2(J) is smaller than a reference phase difference.

If the difference between the count values is smaller than the reference value E (i.e., "YES" is determined at step S13), the process proceeds to step S17. If the difference between the count values is not smaller than the reference value E (i.e., "NO" is determined at step S13), the process proceeds to step S15 where the count value of the second phase counter (J) is assigned to the first phase counter (I).

That is, the count value of the first phase counter (I) is shifted to be equal to the count value of the second phase counter (J) at step S15, and thereby the correction amount R(I) designated based on the first phase counter (I) is shifted to the correction amount R(J) that is designated based on the second phase counter (J).

The CPU 77 executing step S13 functions as "a determining portion", while the CPU 77 executing step S15 functions as "a first shifting portion".

The first estimated phase point P1(I) may greatly differ from the actual phase of the drive gear 63C, due to delay in detection of the detecting phase point P(0) of the drive gear 63C, which can be caused by failure in drive for the drive gear 63C or failure in detection by the origin sensor 73, for example.

In this case, the first estimated phase point P1(I) could greatly differ from the second estimated phase point P2(J) when step S11 is completed, because the second estimated phase point P2(J) is reset to P(0) at step S11 based on the actual detection of the detecting phase point P(0).

Therefore, it is preferable to correct the first estimated phase point P1(I) based on the second estimated phase point P2(J) so that the first estimated phase point P1(I) becomes more approximate to the actual phase of the drive gear 63C. For this reason, the first estimated phase point P1(I) (or the count value of the first phase counter (I)) is corrected by the above error processing at step S15, in the present aspect.

When step S15 is completed, the process proceeds to step S17 where the CPU 77 determines whether the count value of the second phase counter (J) is equal to or larger than Number of lines per cycle HM. The count value of the second phase counter (J) is currently set to "0", and therefore "NO" will be determined at step S17. Then the process proceeds to step S19.

At step S19, the adjusted value RI is calculated as the average of the correction amounts R(I) and R(J). Thereby, the writing time is corrected by the adjusted value R' intermediate between the correction amounts R(I) and R(J) (or more specifically, by the average of the correction amounts R(I) and R(J)).

In this way, the writing time for each scanning line is corrected by the adjusted value R' intermediate between the correction amounts R(I) and R(J), after the origin sensor 73 has detected the detecting phase point P(0) For example, the writing time is corrected by R' shown in FIG. 9, where R' is the average of R(I) and R(J) for I=3 to 8, and R(J) is equal to R(I−3).

When the difference between the correction amounts R(I) and R(J) becomes smaller than the predetermined value D, "YES" is determined at step S23. Then, the count value of the second phase counter (J) is assigned to the first phase counter (I). Thereby, the correction amount R(I) designated based on the first phase counter (I) is shifted to the correction amount R(J) that is designated based on the second phase counter (J).

Thereafter, the writing time is corrected by the adjusted value R' that is equal to the correction amount R(I). For example, the writing time for each scanning line is corrected by the adjusted value R' shown in FIG. 9, where R' is equal to R(I) for I=6 to 8.

Thus, at step S25, the first estimated phase point P1(I) is corrected or reset to be equal to the second estimated phase point P2(J), which is based on the actual detection of the detecting phase point P(0). Thereby, the accumulated error in the first estimated phase point P1(I) is mitigated.

Further, the correction or reset of the first estimated phase point P1(I) is performed when the difference between the correction amounts R(I) and R(J) becomes smaller than the predetermined value D. Thereby, abrupt change of the adjusted value R' due to the shift at step S25 can be prevented. That is, the error in phase estimation can be suppressed while preventing degradation of image quality.

(B) When Estimated Phase is Behind Actual Phase

Figure 10:
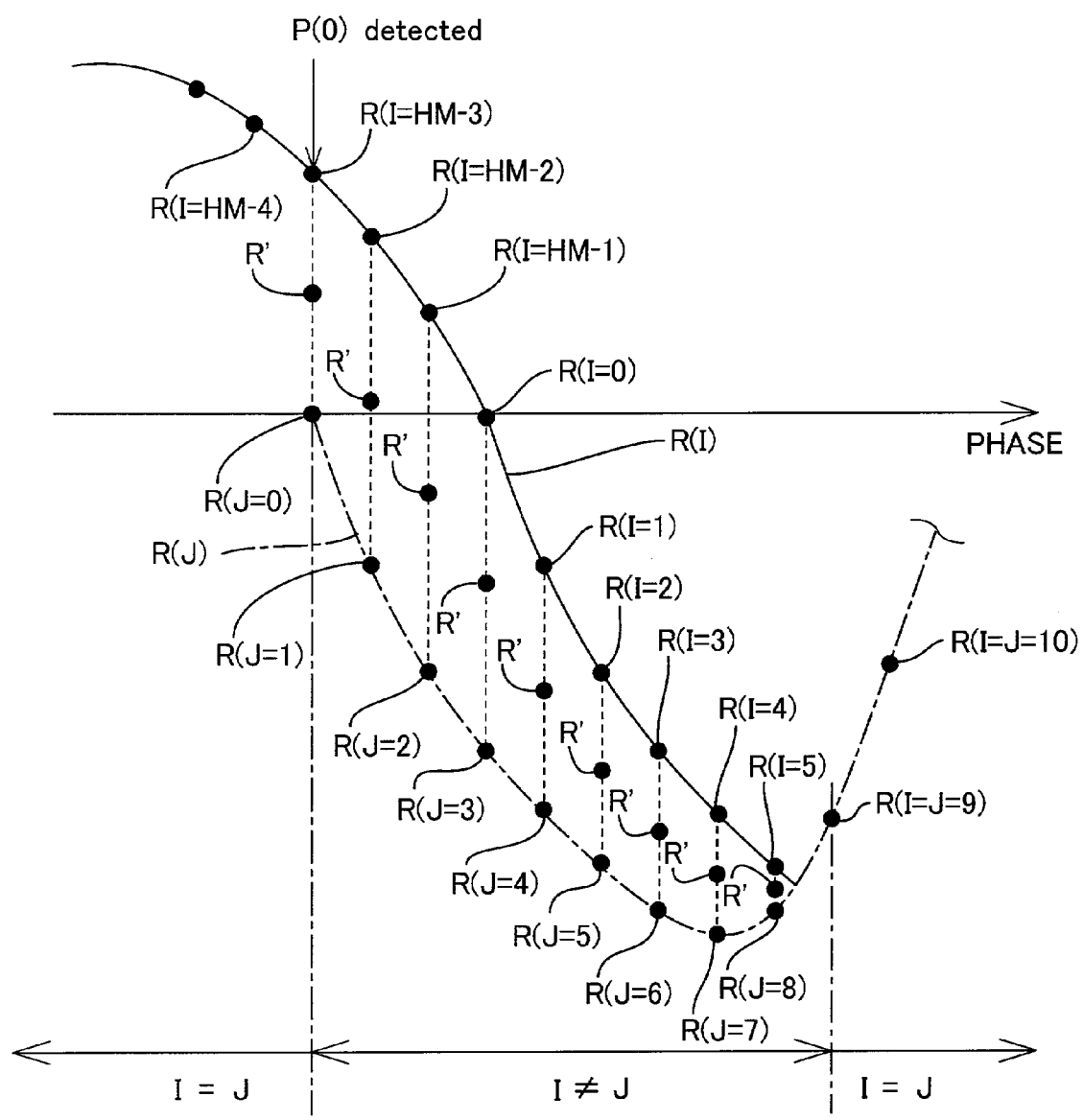
FIG. 10 is a graph showing variation in correction amounts when estimated phase is behind actual phase.

In the case that the internal clock (or the current time counter C) is prone to be behind of the actual time, the CPU 77 determines that the first estimated phase point P1(I) has reached the detecting phase point P(0) after the actual phase of the drive gear 63C reached the detecting phase point P(0), as shown in FIG. 10.

That is, before the count value of the first phase counter (I) reaches Number of lines per cycle HM, the origin sensor 73 detects the detecting phase point P(0) of the drive gear 63C (i.e., "YES" is determined at step S7).

If "YES" is thereafter determined at step S13, the process proceeds to step S17. At step S17, "YES" will be determined because the count value of the second phase counter (J) was just set to "0". Then the process proceeds to step S19.

At step S19, the adjusted value R' is calculated as the average of the correction amounts R(I) and R(J). Thereby, the writing time is corrected by the adjusted value R' the correction amounts R(I) and R(J) (or more specifically, by the average of the correction amounts R(I) and R(J)).

In this way, the writing time for each scanning line is corrected by the adjusted value R' intermediate between the correction amounts R(I) and R(J), after the origin sensor 73 has detected the detecting phase point P(0).

For example, the writing time is corrected by R' shown in FIG. 10, where R' is the average of R(I) and R(J) for I=(HM−3) to (HM−1), and R(I) is equal to R(HM−3+J). After the count value of the first phase counter (I) has reached Number of lines per cycle HM (i.e., after the first phase counter (I) is set to "0" at step S35), the writing time is corrected by R' shown in FIG. 10, where R' is the average of R(I) and R(J) for I=0 to 5, and R(I) is equal to R(J−3).

When the difference between the correction amounts R(I) and R(J) becomes smaller than the predetermined value D, "YES" is determined at step S23. Then, the count value of the second phase counter (J) is assigned to the first phase counter (I). Thereby, the correction amount R(I) designated based on the first phase counter (I) is shifted to the correction amount R(J) that is designated based on the second phase counter (J), so that the accumulated error in the first estimated phase point P1(I) is mitigated.

Thereafter, the writing time is corrected by the adjusted value R' that is equal to the correction amount R(I). For example, the writing time for each scanning line is corrected by the adjusted value R' shown in FIG. 10, where R' is equal to R(I) for I=9 or 10.

(Effect of the Present Aspect)

(1) It can be proposed as an alternative that the correction amount R(I) designated based on the first phase counter (I) is shifted to R(0) (i.e., the count value of the first phase counter (I) is shifted to "0") when the origin sensor 73 has detected the detecting phase point P(0) of the drive gear 63C.

However, according to this alternative, the shift amount of the correction amount R(H) (e.g., the difference between the pre-shift correction amount R(HM−3) and the post-shift correction amount R(C) in FIG. 10) could be large. Consequently, the scanning line interval B may be abruptly changed due to the shift of the correction amount R(I), which could adversely affect the image quality.

In contrast, according to the present aspect, the correction amount R(J) based on the second phase counter (J) is set to R(0) at the time of actual detection of the detecting phase point P(0), and the writing time for each scanning line is corrected by an adjusted value R' intermediate between the correction amounts R(I) and R(J).

Thereby, abrupt change of the scanning line interval B around the detecting phase point P(0) can be suppressed, and consequently the effect of variation in rotational speed of the photoconductor 33 on image quality can be suppressed adequately.

(2) If the first estimated phase point P1(I) has reached the detecting phase point P(0) before actual detection of the detecting phase point P (0), the writing time is thereafter corrected by the adjusted value R' intermediate between the correction amounts R(I) and R(0) until the actual detection of the detecting phase point P(0).

Thereby, inadequacy of the scanning line interval correction due to error in the first estimated phase point P1(I) can be mitigated, until the actual detection of the detecting phase point P(0) after the first estimated phase point P1(I) has reached the detecting phase point P(0). Consequently, the effect of variation in rotational speed of the photoconductor 33 on image quality can be suppressed adequately.

(3) After the actual detection of the detecting phase point P(0), the writing time is also corrected by the adjusted value R' intermediate between the correction amounts R(I) and R(J).

Thereby, inadequacy of the scanning line interval correction due to error in the first estimated phase point P1(I) can be mitigated even after the actual detection of the detecting phase point P(0). Consequently, the effect of variation in rotational speed of the photoconductor 33 on image quality can be suppressed adequately.

(4) In the present aspect, the change characteristics information is provided individually for the respective colors (i.e., for the respective photoconductors 33). Therefore, scanning line interval correction for an image of each color is accurately performed based on proper change characteristics information. Consequently, the effects of variations in rotational speeds of the photoconductors 33 on quality of the resultant color image can be adequately suppressed.

However, in the case that some of the photoconductors 33 have similarities or a relationship in their rotational behavior, common change characteristics information may be used for the photoconductors, as described below.

<Other Illustrative Aspects>

The present invention is not limited to the illustrative aspect explained in the above description made with reference to the drawings. The following illustrative aspects may be included in the technical scope of the present invention, for example.

(1) In the above aspect, the adjusted value R' is calculated as the average of the correction amounts R(I) and R(J), because the average is preferable as the adjusted value R' to be derived from the varying correction amounts R(I) and R(J).

However, the adjusted value R' is not limited to the average of the correction amounts R(I) and R(J), but rather may be any value intermediate between the correction amounts R(I) and R(J).

(2) In the above aspect, the error processing and the determination therefor are executed at steps S13 and S15, when the origin sensor 73 has detected the detecting phase point P(0) (i.e., when the second estimated phase point P2(J) is P(0)).

However, the error processing and the determination therefor may be executed, when the second estimated phase point P2(J) is not P(0). For example, steps S13 and S15 may be executed after step S35. Then, the CPU 77 functions as "a determining portion" and "a third shifting portion".

(3) In the above aspect, the change characteristics information is stored as a table showing the correspondence relation between the phase point numbers and the correction amounts R(H).

However, the change characteristics information may be stored as function representation of the correspondence relation between the phase points and the correction amounts R(H).

(4) The change characteristics information stored in the NVRAM 83 is not limited to the correction amounts R(H). Instead, the correction differences ΔR(H) between two adjacent correction amounts R(H) and R(H−1) or the rotational speed values V of the drive gear 63 (shown by the solid line G1 in FIG. 6) may be stored as change characteristics information in the NVRAM 83.

In the case that the rotational speed values V of the drive gear 63 are stored as the change characteristics information, the correction amounts R(H) and/or the correction differences AR (H) (to be used for correction of scanning line interval B) should be derived from the rotational speed values V of the drive gear 63.

(5) In the above aspect, the starting time (or writing time) for each scanning line is adjusted in order to correct the scanning line interval B (or image forming position). However, the rotational speed V of the photoconductor 33 (as a rotator) may be adjusted instead, in order to correct the scanning line interval B.

(6) In the above aspect, an optical transmission sensor is used as the origin sensor 73 for detecting the time when the drive gear 63C has reached the detecting phase point P(0).

However, instead of the transmission sensor, an optical reflection sensor may be provided (as "an detecting portion"

of the present invention), so that the detecting phase point P(0) can be detected based on a light reflected from a reflective mark formed at a predetermined position of the drive gear 63C.

Further, instead of an optical sensor, a magnetic sensor or a contact sensor may be used as the origin sensor 73 for detecting the time when the drive gear 63C has reached the detecting phase point P(0).

In the above aspect, the origin sensor 73 detects when the current phase of the drive gear 63C (provided for driving the photoconductor 33C) has reached the detecting phase point P(0), and thereby indirectly detects when the current phase of the photoconductor 33 has reached the detecting phase point P(0). That is, the sensor as "a detecting portion" indirectly detects the time when the rotator has reached the detecting phase point P(0), by detecting a predetermined status of a drive mechanism provided for driving the rotator.

However, a sensor such as an optical sensor, a magnetic sensor or a contact sensor (provided as "a detecting portion" of the present invention) may be configured to detect a predetermined point on the photoconductor 33C (or rotator), so as to directly detect the time when the photoconductor 33C has reached the detecting phase point P (0).

(7) In the above aspect, the change characteristics information is provided individually for respective colors (or for respective photoconductors 33). However, common change characteristics information may be used for some of the photoconductors 33.

For example, in FIG. 6 of the above aspect, the graph showing the variation of the rotational speed V of the drive gear 63K or 63C is symmetrical to the graph showing the variation of the rotational speed V of the drive gear 63Y or 63M (that is arranged symmetrical to the above drive gear 63K or 63C with respect to the drive motor 71) with respect to the phase axis.

Therefore, the change characteristics information for one of the drive gear 63K or 63C and the drive gear 63Y or 63M is stored in the NVRAM 83, and the correction amount for the other may be derived therefrom.

(8) In the above aspect, an LED printer of a direct-transfer type is shown as an image forming apparatus. However, the present invention can be applied to an electrophotographic printer of another type such as a laser printer, and further can be applied to a printer of an intermediate-transfer type.

In the case that the present invention is applied to an electrophotographic printer, variation of the forming position of a developer image (or a toner image) due to variation in rotational speed of a rotator (such as a conveyor belt 31, a conveyor roller or a transfer belt) may be corrected by a correction process according to the present invention, contrary to the above aspect wherein variation of the forming position of an electrostatic latent image due to variation in rotational speed of a photoconductor 33 is corrected by a correction process.

For example, in the case that variation of the forming position of a toner image on a recording medium 7 due to variation in rotational speed of a conveyer belt 31 is corrected by a correction process of the present invention, correction amounts to be used for adjusting the scanning line interval B during line scanning should be determined based on the measured values of rotational speed of the conveyer belt 31.

The present invention can be also applied to an ink-jet printer or a thermal printer. Further, the present invention may be applied to a printer that uses colorants of two or three colors, or colorants of five or more colors.

In the case that the present invention is applied to an ink-jet printer or a thermal printer, variation of the forming position of an ink image due to variation in rotational speed of a rotator (such as a conveyor roller) can be corrected by a correction process according to the present invention.

What is claimed is:

1. An image forming apparatus comprising:
   an image forming portion having a rotator and being configured to form an image on at least one of said rotator and a recording medium traveling with rotation of said rotator;
   a storage portion configured to store change characteristics information relevant to correction parameters corresponding to phase points of said rotator;
   a first designating portion configured to determine a first estimated phase point as an estimation of a current phase of said rotator based on a base time point, and designate, as a designated parameter, the correction parameter corresponding to said first estimated phase point based on said change characteristics information;
   a correcting portion configured to correct an image forming position on said at least one of said rotator and said recording medium based on said designated parameter;
   a detecting portion configured to detect that said rotator has reached a detecting phase point; and
   a changing portion configured to change a value of said designated parameter into an adjusted value intermediate between said designated parameter and a reference parameter so that said correcting portion corrects the image forming position based on said adjusted value, said reference parameter being a correction parameter designated from said correction parameters based on a time when said detecting portion detects said detecting phase point.

2. An image forming apparatus as in claim 1, further comprising:
   a timer portion configured to measure time;
   wherein said first designating portion determines said first estimated phase point based on an elapsed time measured by said timer portion since said base time point.

3. An image forming apparatus as in claim 1, wherein, while said first estimated phase point is ahead of an actual phase of said rotator, the correction parameter corresponding to said detecting phase point is designated as said reference parameter until said detecting portion detects said detecting phase point after said first estimated phase point has reached said detecting phase point.

4. An image forming apparatus as in claim 1, wherein said adjusted value is determined as an average of said designated parameter and said reference parameter.

5. An image forming apparatus as in claim 1, further comprising:
   a determining portion configured to determine whether a phase difference between said first estimated phase point and said detecting phase point is equal to or larger than a reference phase difference; and
   a first shifting portion configured to shift said designated parameter to be equal to the correction parameter corresponding to said detecting phase point by shifting said first estimated phase point to be equal to said detecting phase point, if said determining portion determines that said phase difference is equal to or larger than said reference phase difference.

6. An image forming apparatus as in claim 1, further comprising a second designating portion configured to determine a second estimated phase point as an estimation of the current phase of said rotator based on a time when said detecting portion detects said detection phase point, and designate, as said reference parameter, the correction parameter corresponding to the second estimated phase point based on said change characteristics information.

7. An image forming apparatus as in claim 6, further comprising a second shifting portion configured to shift said designated parameter to be equal to said reference parameter by shifting said first estimated phase point to be equal to said second estimated phase point, if a difference between said designated parameter and said reference parameter is smaller than a predetermined value.

8. An image forming apparatus as in claim 6, wherein said adjusted value is determined as an average of said designated parameter and said reference parameter.

9. An image forming apparatus as in claim 6, further comprising:
- a determining portion configured to determine whether a phase difference between said first estimated phase point and said second estimated phase point is equal to or larger than a reference phase difference, when one of said first estimated phase point and said second estimated phase point is set to said detecting phase point; and
- a third shifting portion configured to shift said designated parameter to be equal to said reference parameter by shifting said first estimated phase point to be equal to said second estimated phase point, if said determining portion determines that said phase difference is equal to or larger than said reference phase difference.

10. An image forming apparatus as in claim 1, wherein:
said image forming portion is capable of forming a color image and a monochrome image; and
correction of the image forming position by said correcting portion is skipped during formation of a monochrome image.

11. An image forming apparatus as in claim 1, wherein:
said rotator of said image forming portion includes a plurality of rotators provided for respective colors, and said image forming portion is capable of forming a color image by forming an image on each of said plurality of rotators; and
said change characteristics information stored by said storage portion is provided individually for each of said plurality of rotators.

12. An image forming apparatus as in claim 1, wherein said rotator is a carrier capable of holding a developer image directly or indirectly via a recording medium.

* * * * *